Patented Oct. 28, 1930

1,779,481

UNITED STATES PATENT OFFICE

GEORGE C. MARTIN, OF LOS ANGELES, CALIFORNIA

CONCRETE CONSTRUCTION AND METHOD OF WATERPROOFING THE SAME

No Drawing. Application filed May 14, 1928. Serial No. 277,793.

This invention relates to concrete construction and methods of waterproofing the same. In particular the invention contemplates a method of applying waterproofing to concrete in such a manner as to cause an intimate bond between the waterproofing and said concrete.

Another object is the provision of a method of waterproofing for protecting concrete from substances or for other purposes in which the substance applied to the concrete aids in the promotion of the set of said concrete.

Another object is the method of using concrete in such a manner as to hasten the initial setting of the concrete to the end that concrete which would ordinarily take ten days to properly set may be set within 24 to 48 hours.

The method about to be outlined and described is particularly adaptable for use for road construction, dam or reservoir construction, or in fact any place where concrete is used. In case of road construction, it is customary to pour the concrete, tamp the same, and then to keep it watered for a considerable length of time during the setting period of the concrete. After the setting, in the case of roadways, in certain localities it is customary to paint the surface of the concrete with hot asphaltum, and then apply a layer of asphaltum thereover, the hot asphaltum acting to promote a bond between the concrete, and said asphalt layer. However, in roadway construction, numerous difficulties are encountered in that the asphaltum chips from the concrete, leaves ruts, buckles, or does what it known as "bellying" in hot weather, so that a rippling or corduroy appearance results which makes riding thereover extremely uncomfortable. In the case of reservoirs or dams, I may utilize the waterproofing material which is applied to the concrete in such a manner that it has an intimate bond with the concrete and cannot be chipped from the concrete. Actual experiment has indicated that concrete can be broken and hammered and the waterproofing substance about to be described will adhere tenaciously thereto without chipping from the concrete, in fact, leaving a clear line of cleavage.

In practicing my invention, and assuming a roadway, the base of the road is first prepared in the usual manner, after which the concrete is poured, as is customary. This concrete, while in its wet condition, is tamped so as to level the same. Asphaltum which comprises asphalt mixed with sand is next heated to say 300° F., and this heated asphaltum and sand mixed is then poured or spread upon the wet concrete and before the concrete has been allowed to in any way set. The asphaltum is tamped lightly and a hot roller of the hand type may then be moved back and forth over the asphaltum to level the same. The hot asphaltum upon contact with the wet concrete will convert the surface water into steam and as this steam cannot escape through the asphaltum, it is forced through the concrete. Concrete, of course, is a mixture of conglomerate with cement and manufacturers of cement incorporate within the cement gypsum in order to retard the setting of the cement. Steam, however, will readily dissolve the gypsum so that the cement may set. Of course, the steam permits the cement to set very quickly whereas the ordinary application of water, which is cold, does not permit the gypsum to be readily dissolved except over a period of time with the result that many days must be consumed before the gypsum is entirely dissolved and the concrete can be assumed to be finally set. With my system and method, however, the concrete is practically ready for use within 24 to 48 hours after application of the asphaltum. The commercial aspect of the invention may be readily appreciated, as a time saver and, furthermore, from an economy standpoint.

In the case of dams or reservoirs, the same procedure could be followed through. It has been found that after the concrete has set that there is an intimate bond between the asphaltum and the concrete, and that it is impossible to chip the asphaltum from the concrete. The asphaltum apparently is received within the different interstices of the wet concrete so that the asphaltum obtains a grip or hold upon the concrete that is difficult to dislodge.

Experiments carried out by the inventor have indicated the need of protecting the surface of concrete against influence of water where the concrete is used as a dam or reservoir. Tests made of concrete show that concrete will weaken under the influence of water and that the water will seep therein so that the factor of safety calculated for a dam is quite erroneous after a period of time. By using the present invention and the application of the waterproofing substance, such as asphaltum, to that surface of the concrete which is adapted to normally have contact with water, water of course would be prevented from seeping within the concrete and thus the original strength of the concrete dam or reservoir will be maintained.

Many other uses may be found for the present invention and it is apparent that the present invention accomplishes two functions of great importance, first, it hastens the initial set of the concrete, and, second, forms an intimate bond with the concrete so that the same cannot be readily dislodged from the concrete.

It is obvious that various adaptations and modifications and variations in the use of the invention may be resorted to without, however, departing from the true spirit of the invention.

Having thus disclosed my invention, what I claim as new and desire to secure by Letters Patent is:

1. The method of obtaining complete hydrolysis of initially laid wet concrete, which consists in applying to a surface of said wet concrete a heated waterproofing substance adapted to cause the water content of said concrete to vaporize.

2. The method of promoting hydrolysis of cement, which consists in applying hot asphaltum to a surface of the wet cement.

3. The method of waterproofing and promoting complete hydrolysis of concrete, which consists in first pouring the wet concrete, then applying hot asphaltum to a surface of said poured concrete.

4. The method of waterproofing and permitting hydrolysis in concrete, which consists in first pouring the neat concrete and while it is still wet applying to the surface thereof asphaltum heated to a temperature sufficient to cause steam in the concrete to thereby promote a quicker solution of the retarding bodies of the cement in the concrete.

5. The method of waterproofing fresh or green concrete which consists in applying to a surface of said concrete, hot asphaltum to thereby displace the water content of the concrete by vaporizing the same and whereby hydrolysis of the concrete is permitted and an intimate mechanical bond between the concrete and the asphaltum effected.

In testimony whereof, I have signed my name to this specification at Los Angeles, California, this 15th day of April, 1928.

GEORGE C. MARTIN.